United States Patent [19]
Costello

[11] 3,861,284
[45] Jan. 21, 1975

[54] CUP LIDS FOR USE WITH TEABAGS AND THE LIKE

[76] Inventor: Albert D. Costello, 303 E. Eagles St., East Boston, Mass. 02128

[22] Filed: July 9, 1973

[21] Appl. No.: 377,259

[52] U.S. Cl. ................................... 99/321, 99/323
[51] Int. Cl. ............................................. A47j 31/00
[58] Field of Search ............ 99/290, 323, 321, 322, 99/320, 318, 319, 317; 100/123, 234; 222/570, 568

[56] References Cited
UNITED STATES PATENTS

| | | | |
|---|---|---|---|
| 1,281,984 | 10/1918 | Long | 100/123 |
| 2,358,556 | 9/1944 | Block | 99/321 |
| 2,800,408 | 7/1957 | Fimple | 100/234 |
| 3,550,528 | 12/1970 | O'Neill | 100/234 |

*Primary Examiner*—Robert W. Jenkins
*Attorney, Agent, or Firm*—Morse, Altman, Oates & Bello

[57] ABSTRACT

A lid is provided for use in the brewing of a cup of tea or similar beverage in which a packet of infusion commodity is temporarily dipped into a cup of water or the like. The lid is formed with a base flange adapted to be mounted to the rim of a cup containing water, for example, if tea is to be brewed, and has an integral upright funnel having somewhat resilient walls and adapted to store a teabag placed therein. In a modification, a funnel is attached to the top of the cup or glass by means of a spray clamp in place of a base flange. The bag string passes out through the top of the funnel and may be caught on a notch to hold the bag in a raised position. The bag is lowered into the cup by releasing the string and, when the tea is sufficiently steeped, the bag is again drawn up into the funnel and the walls compressed to squeeze excess liquid from the bag and the lid removed.

10 Claims, 11 Drawing Figures

PATENTED JAN 21 1975 3,861,284
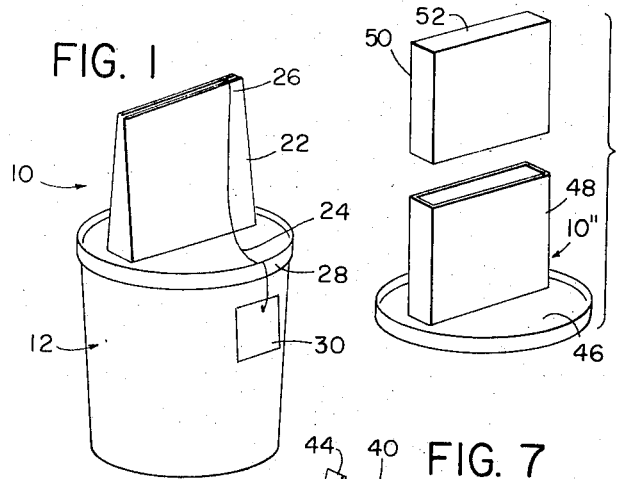
FIG. 1
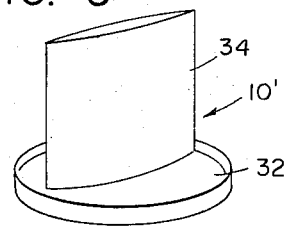
FIG. 5
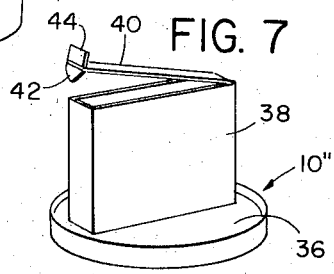
FIG. 8
FIG. 7
FIG. 6
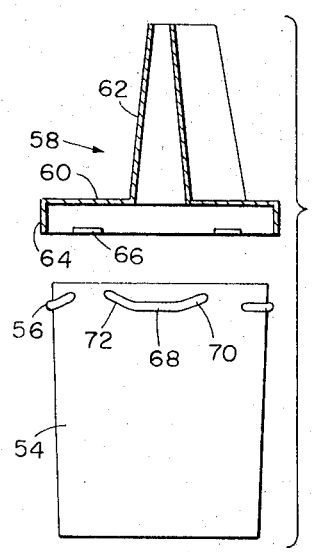
FIG. 9
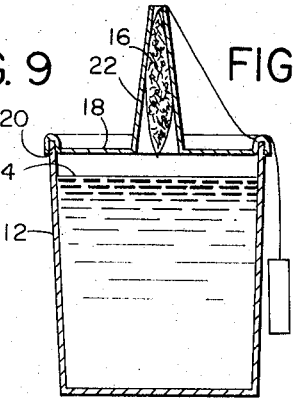
FIG. 2
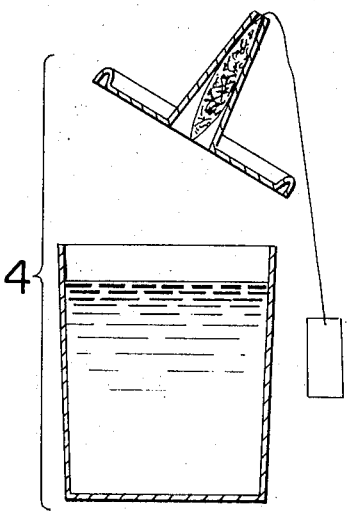
FIG. 4
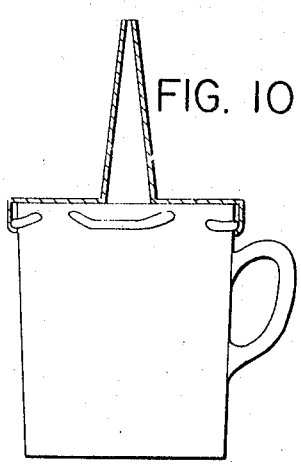
FIG. 10
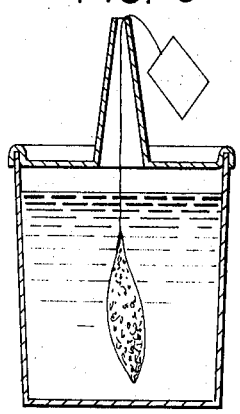
FIG. 3
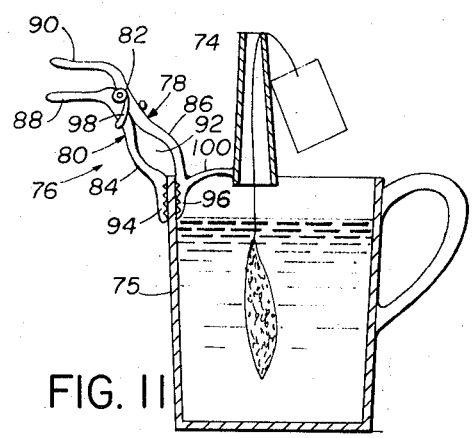
FIG. 11

CUP LIDS FOR USE WITH TEABAGS AND THE LIKE

BACKGROUND OF THE INVENTION

1. Field of the Invention

This invention relates generally to cup lids and more particularly is directed towards a new and improved lid for use in brewing tea or the like with a teabag.

2. Description of the Prior Art

A beverage such as coffee or the like that is sold at lunch counter for consumption off the premises, normally is placed in a disposable cup and covered with a lid that fits over the top of the cup to prevent spillage. These containers are used for coffee, cocoa, tea, etc., and for such hot drinks the cup portion is normally an insulating material. While these containers have proven satisfactory for coffee and cocoa, they are not satisfactory for use with tea insofar as the counterman normally drops the teabag into the cup of hot water and puts the lid on the top of the cup. Since a certain time delay is normally encountered before the cup is delivered or brought to the location where it is to be consumed, the tea may have steeped too long and thus become undesirably strong or bitter. Also, when the bag is removed it often takes a substantial quantity of liquid with it and there is no convenient means for squeezing the bag reasonably dry before it is discarded.

Accordingly, it is an object of the present invention to provide improvements in lids for cups used for beverages. It is a more particular object of this invention to provide a lid for a beverage cup especially suited for use with a teabag to prevent overbrewing of the tea. A still further object of this invention is to provide a lid for a beverage cup adapted for use with tea wherein a teabag may be squeezed prior to disposal.

SUMMARY OF THE INVENTION

This invention features a lid for use with a beverage cup comprising a base flange adapted to fit over the top of a cup and formed with an upright funnel adapted to store, temporarily, a teabag or the like therein. The funnel is open at its lower end and is formed with a restricted opening at its upper end whereby a teabag may be initially stored therein until the tea is to be brewed. The bag is then lowered into the cup and allowed to steep until the tea is brewed to taste. The bag is then drawn up into the funnel and the walls thereof are pressed to squeeze out excess liquid and the lid removed. In a modification of the invention, the lid is combined with a cup having a screw-on connection for locking the parts together and in another modification a funnel is mounted by means of a spring clamp in place of a base flange.

BRIEF DESCRIPTION OF THE DRAWINGS

FIG. 1 is a view in perspective of a lid made according to the invention and mounted on a cup, FIG. 2 is a sectional view in side elevation of the FIG. 1 combination with a bag in a stored position, FIG. 3 is a view similar to FIG. 2 showing the bag in a lowered position, FIG. 4 is an exploded sectional view in side elevation showing the bag returned to its storage position and removed from the cup, FIG. 5 is a perspective view showing a modification of the invention, FIG. 6 is a view similar to FIG. 5 illustrating the technique for opening the mouth of the funnel, FIG. 7 is a view in perspective showing another modification of the invention, FIG. 8 is an exploded view in perspective showing yet another modification of the invention, FIG. 9 is an exploded view in side elevation, partly in cross-section, illustrating a still further modification of the invention, FIG. 10 is a view in side elevation partly in section showing the FIG. 9 modification in the assembled position, and, FIG. 11 is a sectional side elevation of still another modification of the invention.

DETAILED DESCRIPTION OF THE PREFERRED EMBODIMENTS

Referring now to the drawings and to FIGS. 1 through 4 in particular, the reference character 10 generally indicates a lid detachably connected to the top of a cup 12 containing a quantity of hot water 14 adapted to be brewed into tea when a teabag 16 is immersed therein. The embodiment of FIG. 1 is primarily adaped for use with disposable cups of the sort used by lunch counters, street vendors and the like wherein drinks are intended to be consumed off the premises. In such cases the cup 12 is normally fabricated from a heat-insulating material such as foamed plastic or treated cardboard, for example.

The lid 10 may be fabricated from a relatively thin, light and yet somewhat rigid plastic material. The lid may be fabricated by various techniques such as molding, vacuum forming or the like and includes a circular base flange 18 having a peripheral inverted U-shaped channel 20 adapted to fit snugly over the rim of the cup 12 as best shown in FIGS. 2 and 3. Extending vertically upward from the flange 18 is a diametrical narrow funnel 22 open at both ends and of a height, width and thickness generally corresponding with but slightly greater than the dimensions of the teabag 16. Preferably the funnel 22 is somewhat wedge-shaped not only to permit nesting of lids 10 for convenience in packing and storing but also to provide a slight wedging action with the bag 16 stored therein.

The bag may be held in a raised position as shown in FIG. 2 either by wedging the bag up into the narrow part of the funnel or by catching a teabag string 44 in a notch 26 or 28 formed either at the top of the funnel 22 or in the outer edge of the base flange 18. The string 24 typically terminates in a tag 30.

In practice, if tea is to be brewed, the cup 12 is first filled with hot water and then a teabag is placed in the funnel with the string caught in either of the notches 26 and 28 to hold the bag in the stored position. The lid is then placed on the cup and the customer carries the cup to its destination. When the customer is ready to brew his tea, he merely unhooks the string from the notch and lowers the bag down into the hot water as shown in FIG. 3. Should the bag be wedged in the funnel, a slight squeezing action applied to the ends of the funnel will widen it transversely to facilitate release of the bag. The bag is allowed to remain in the water for a time selected to suit the taste of the customer. Thereupon the bag is drawn back up into the funnel and the flat sides of the funnel will be depressed by the fingers to squeeze out excess tea from the bag. The lid together with the bag is then removed and discarded as suggested in FIG. 4.

Referring now to FIGS. 5 and 6 there is illustrated a modification of the invention and, in this embodiment, a lid 10¾s formed with a base flange 32 similar to the base flange 18 of the principal embodiment. However, in this embodiment an upstanding funnel 34 is somewhat elliptical in cross-section and the top mouth of the funnel is normally closed. The mouth may be easily opened by squeezing the ends of the funnel as suggested in FIG. 6. In this fashion the bag may be readily inserted and the deformation of the funnel may be employed to release the bag down into the water when ready for brewing. The configuration keeps the cup snugly covered to prevent spillage should the cup inadvertently be tipped. Also, by keeping the funnel closed, the water within the cup will remain hot longer than would be the case if the lid were open.

Referring now to FIG. 7 there is illustrated a further modification of the invention and, in this embodiment, a lid 10¾s formed with a base flange 36 similar to the flange in the principal embodiment and a funnel 38 of a generally box-like configuration is adapted to store a teabag therein. In this embodiment an integral hinged flap 40 serves as a cover for opening and closing the upper end of the funnel 38. The flap 40 typically is provided with an end lip 42 and a tab 44 with the lip 42 adapted to lock down into the funnel while the tab 44 is employed for grasping the flap in order to open it.

Referring now to FIG. 8 there is illustrated a further modification of the invention and in this embodiment a lid 10¾s formed with a base flange 46 similar to the principal embodiment and an upstanding funnel 48 of generally box-like, rectangular configuration. In this embodiment a sleeve 50 is provided to slip over the funnel 48 to permit closing the top of the funnel in order to prevent spillage and also to better insulate the contents. The sleeve 50 is, of course, formed with a closed top wall 52.

Referring now to FIGS. 9 and 10 there is illustrated yet another modification of the invention and in this embodiment a reusable cup 54 of glass, plastic, ceramic or the like such as used in homes and restaurants is formed with arcuate ribs 56 by which a lid 58 may be screw-locked into position. The lid 58 preferably is fabricated from a durable plastic material slightly resilient and formed with a base flange 60 and an upstanding diametrical funnel 62 similar to that of the principal embodiment. However, in this instance the base flange 60 is formed with a peripheral depending skirt 64 having internal lugs 66 adapted to lockably engage the ribs 56 on the cup. The ribs 56 are formed with horizontal straight center portions 68 and slightly upturned end portions 70 and 72 at each end of the center portion. The ribs 68 are spaced apart about the mouth of the cup to permit the lugs 66 to pass therebetween and, by twisting the lid either clockwise or counterclockwise, the lugs will engage the rib portions 70 and 72 in either direction and lock in and under the center portion 68. The lid may be unlocked in the same fashion by rotating the lid either clockwise or counterclockwise. The walls to be depressed and permit the squeezing of excess liquid from the bag after it has been drawn up from the water in the cup.

Referring now to FIG. 11 there is illustrated still another modification of the invention and, in this embodiment, a funnel 74 is detachably mounted over the mouth of a glass or cup 75 by means of a spring-loaded clamp 76. This device is used with standard cups and glasses where no cover is needed. The clamp includes a pair of members 78 and 80 pivoted to one another about a pin 82 and each formed with a jaw 84 and 86 which are opened and closed by finger operated levers 88 and 90 extending generally perpendicularly to the side of the clamp. The jaws formed an enlarged center opening 92 to clear the rim of the cup and terminate in ribbed nose portions 94 and 96 to grip the side of the cup. A coil spring 98 engages both clamp members normally urging them closed and an integral extension 100 connects the funnel 74 to the clamp jaw 86.

Having thus described the invention what I claim and desire to obtain by Letters Patent of the United States is:

1. An attachment for use with a cup adapted to contain water and a stringed teabag or the like, comprising
   a. a pre-shaped funnel,
   b. said funnel including resilient coextensive opposing side walls joined in closely spaced relation along opposing side edges and forming a chamber to receive said bag, and,
   c. connecting means integral with said funnel for detachably fastening said funnel in a generally upright raised position to the lip of said cup and extending inwardly of said lip,
   d. said funnel being formed with a restricted opening at its upper and lower ends whereby a teabag in said chamber may be reciprocated through said lower opening into and out of said cup by means of the teabag string passing through the said upper opening.

2. An attachment according to claim 1 wherein said connecting means is a flange extending perpendicularly from the lower portion of said funnel and dimensioned to cover the top of said cup.

3. An attachment according to claim 2 wherein said flange is formed with a peripheral groove adapted to engage with the rim of said cup.

4. An attachment according to claim 2 in combination with a cup formed with peripheral threads and said flange is formed with a downwardly extending peripheral skirt, said skirt formed with inwardly extending lugs for locking engagement with said threads.

5. An attachment according to claim 1 wherein said connecting means includes a clamp formed with a pair of spring-loaded jaws adapted to grip the rim of said cup.

6. An attachment according to claim 1 wherein said funnel is wedge-shaped.

7. An attachment according to claim 1 wherein said funnel includes a hinged flap at its upper end adapted to close said upper opening.

8. An attachment according to claim 1 in combination with a removable sleeve cover adapted to fit over the upper end of said funnel to close said upper opening.

9. An attachment according to claim 1 including stop means formed on said attachment for temporarily restraining the string of said teabag.

10. An attachment according to claim 1 wherein said side walls normally meet at the upper opposing edges thereof whereby said upper end opening is normally closed, said walls being resilient and slightly curved whereby transverse pressure applied to opposing side edges thereof will cause the upper edges to spread apart.

* * * * *